United States Patent

Vindum

[11] Patent Number: 5,992,909
[45] Date of Patent: Nov. 30, 1999

[54] CONNECTABLE PROP FOR VEHICLE TRUNK LID

[76] Inventor: Jorgen O. Vindum, 1 Woodview Ct., San Ramon, Calif. 94583

[21] Appl. No.: 09/026,019

[22] Filed: Feb. 19, 1998

[51] Int. Cl.[6] ................................................. E05C 17/54
[52] U.S. Cl. ......................... 292/339; 292/288; 292/258
[58] Field of Search ................................ 292/339, 338, 292/288, 258, 262, 276

[56] References Cited

U.S. PATENT DOCUMENTS

| | | | |
|---|---|---|---|
| 1,003,389 | 9/1911 | Winter | 292/262 |
| 2,618,497 | 11/1952 | Gardels | 292/265 |
| 2,766,960 | 10/1956 | Weber | 292/339 |
| 2,783,073 | 2/1957 | Wilde, Jr. | 292/288 |
| 2,973,217 | 2/1961 | Gregoire | 292/288 |
| 2,974,989 | 3/1961 | Hilbers | 292/339 |
| 3,117,689 | 1/1964 | Dedic | 217/60 |
| 4,062,583 | 12/1977 | Taylor | 296/76 |
| 4,070,050 | 1/1978 | Glock et al. | 292/339 |
| 4,124,240 | 11/1978 | Adelberg | 292/262 |
| 4,278,280 | 7/1981 | Rashbaum | 292/263 |
| 4,307,907 | 12/1981 | Barrowman et al. | 292/339 |
| 4,634,170 | 1/1987 | Lach | 296/76 |
| 4,666,194 | 5/1987 | Charman | 292/288 |
| 4,667,993 | 5/1987 | Hannesson et al. | 292/339 |
| 4,932,695 | 6/1990 | Pettit et al. | 292/267 |
| 4,971,374 | 11/1990 | Lovell et al. | 292/339 |
| 5,163,724 | 11/1992 | Conte | 292/258 |
| 5,228,737 | 7/1993 | Zimmerman | 296/76 |
| 5,297,828 | 3/1994 | Chung | 292/258 |
| 5,551,738 | 9/1996 | Thorlton | 292/262 |
| 5,647,619 | 7/1997 | DeLisio | 292/288 |

*Primary Examiner*—Darnell M. Boucher
*Assistant Examiner*—Clifford B Vaterlaus
*Attorney, Agent, or Firm*—Bielen, Peterson & Lampe

[57] ABSTRACT

A connectable trunk prop for maintaining the trunk lid of an automobile in an open position, the trunk lid prop having an elongated brace member with end connectors, one end connector having an eyelet and an end nock for facilitating engagement with a caliper-like engagement assembly of a trunk lid locking mechanism and the other end connector having a clip member with an eye hole and a hole guard that engages the loop portion of a bolt member in the trunk lid locking mechanism.

4 Claims, 1 Drawing Sheet

U.S. Patent  Nov. 30, 1999  5,992,909
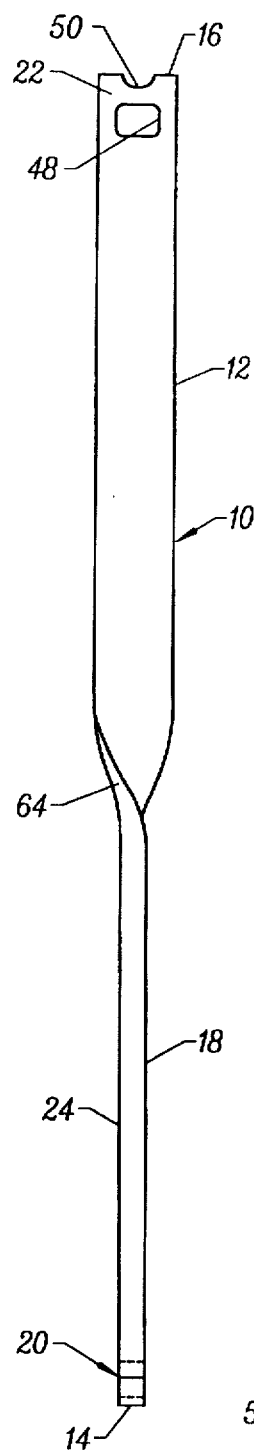
FIG. 1
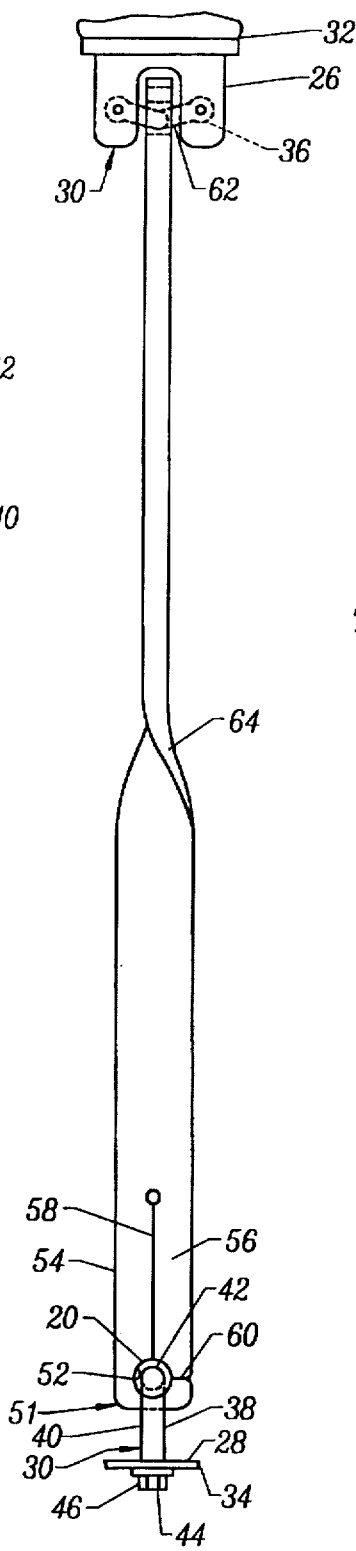
FIG. 2
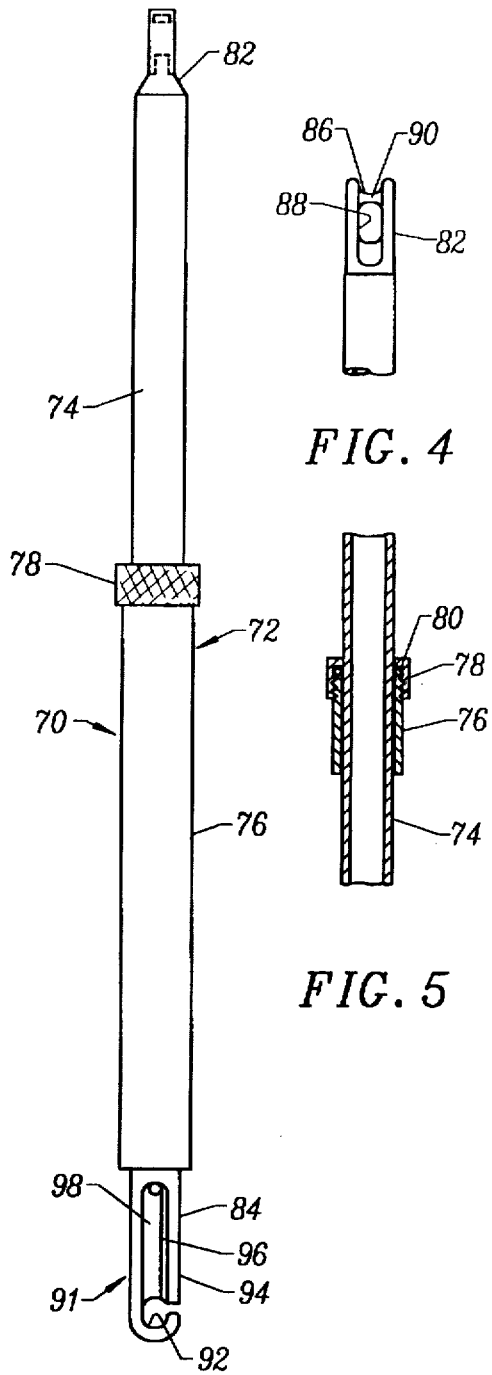
FIG. 3
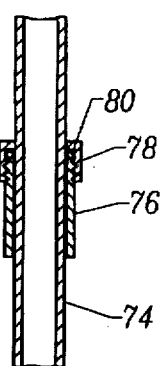
FIG. 4
FIG. 5

CONNECTABLE PROP FOR VEHICLE TRUNK LID

BACKGROUND OF THE INVENTION

This invention relates to a device to maintain the trunk lid of an automobile in an open position. In particular, the trunk lid prop of this invention is simply constructed and designed to connect to the typical trunk locking mechanism of most modern automobiles. Although adaptable for other vehicles, such as station-wagons and hatchbacks, it is generally recommended that a rear opening to the driving and passenger cab be avoided because of potential entry of exhaust fumes if the cab is not well ventilated. Therefore, the trunk lid prop of this invention is primarily designed for the common modern automobile.

The typical modern passenger vehicle has a locking mechanism with a caliper-type, latch in the trunk lid that engages the loop of a staple bolt in the frame structure of the trunk compartment. The caliper-type, latch engages on contact, but requires the use of a trunk key to disengage a pair of caliper members in the latch from the loop of the staple.

A variety of different devices have been constructed to brace or prop a trunk lid for the purpose of maintaining the lid in an open position while transporting goods. For example, the following patents are considered:

Gardel, U.S. Pat. No. 2,618,497, issued Nov. 18, 1952 discloses a trunk lid brace that is lockable and maintains the trunk lid in an open position. Gardel shows and describes a variety of metal bar members formed into different configurations that can be utilized for different trunk-lid, closure mechanisms.

Dedic, Sr., U.S. Pat. No. 3,117,689, issued Jan. 14, 1964 discloses an adjustable prop mechanism that is permanently attached to the bottom of the trunk compartment and includes a telescoping arm mechanism with a shank having a snap hook at its end. The snap hook engages an eye bolt that is fastened to the lid. Additionally, a storage clip engages the arm mechanism when not in use.

Hannesson, U.S. Pat. No. 4,667,993, issued May 26, 1987 discloses a trunk lid brace having an elastomeric member for imparting a shock absorbing effect to the brace. The brace is constructed with an outer tube and an inner elastic member with a hook at one end that engages a U-bolt on the trunk compartment and a hasp member at the opposite end that engages the locking mechanism of the trunk lid. The elastomeric member eliminates the play that may otherwise result preventing a bouncing trunk lid from potentially damaging the brace member or the cargo of the open trunk compartment.

Taylor, U.S. Pat. No. 4,062,583, issued Dec. 13, 1977 describes a telescoping brace mechanism that is secured to the trunk compartment floor at one end and to the lid at the opposite end using a bracket means. The telescopic brace is detachable from the brackets at each end for convenient storage.

Glock et al., U.S. Pat. No. 4,070,050, issued Jan. 24, 1978 discloses a telescoping bracing bar for a hinged lid in the bed of a pick-up truck. The holder mechanism of Glock includes a spiral tension spring that enables the position of the telescoping brace elements to be adjusted when connecting the distal end of the brace elements to the locking mechanism of the trunk lid.

Barrowman et al., U.S. Pat. No. 4,307,907 issued Dec. 29, 1981 describes a four-bar linkage mechanism for extending the trunk lid to a fully open position when the linkage mechanism is manually extended from a compact, closed position to the extended position.

The connectable trunk lid prop of this invention is designed to engage and brace a trunk lid having a mechanism similar to that shown in the references of Hannesson et al, and Barrowman et al. Preferably, the subject brace member is simple in design and inexpensive to fabricate. Each of the devices described in the above references has certain deficiencies that prevents its widespread use. Foremost is the unnecessary complexity of the mechanisms used to construct the brace. The simpler devices of Hannisson et al. and Gardels are preferred because they are easily and inexpensively fabricated. In the preferred embodiment of this invention, the connectable prop is fabricated from a single piece of rectangular bar stock. The bar stock is preferably of a plastic or other nonconductable material and has a rectangular cross section with a thickness generally greater than strap stock. The ends of the bar stock are cut with optimized connection configurations to enable the brace member to connect to the standard trunk lid locking mechanism. For proper orientation, the flat bar stock is twisted at the center so the ends are radially displaced ninety degrees. In addition to orienting the end connectors, the central twist improves the structural integrity of the elongated brace member.

In an alternate embodiment, the brace member forming the body of the trunk lid prop is formed by a pair of tube members that are telescopically engaged and secured by a collar, which maintains the selected length of the brace member. The telescoping prop has similar end connectors that connect to the separated parts of the conventional trunk lid locking mechanism described.

SUMMARY OF THE INVENTION

The connectable prop for a vehicle trunk lid of this invention comprises a simple brace member having ends with end connectors for easily connecting the connectable prop to a conventional trunk lid locking mechanism. The elongated brace member forming the body of the prop is preferably fabricated as a unitary strut with one end having a recess or nock and a juxtapositioned aperture. This design of the end connector facilitates engagement of the end connector with the retractable engagement members of the trunk lid part of the locking mechanism. The opposite end of the brace member has an eyelet with a displacable access guard that is formed by slitting the strut member at the eyelet. In this manner the guard can be displaced to allow this end connector to engage the loop of a staple bolt that typically comprises the part of the locking mechanism located on the trunk frame of the trunk compartment.

In use, the connectable prop is first connected to the staple bolt that is secured to the frame of the trunk compartment. The brace member is then raised to position the nock on the opposite end against the latch of the locking mechanism in the trunk lid. The trunk lid is displaced to enable the positioned nock to separate the engagement members of the latch, allowing the engagement members to return through the aperture locking the lid to the raised end connector of the brace member.

In an alternate embodiment, the connectable prop is constructed with a telescoping brace member having end connectors that are similar to the end connectors of the previously described strut. It is to be understood that there may be a reversal, or alterations in the end connectors to facilitate the engagement of each connector means with the locking mechanism of a particular vehicle. These and other features will become apparent from a detailed consideration of the preferred embodiments that follow.

BRIEF DESCRIPTION OF THE DRAWINGS

FIG. 1 Is an elevational view of the connectable trunk lid prop of this invention.

FIG. 2 Is a side view of the connectable prop of FIG. 1 shown connected to part of a typical locking mechanism of an automobile.

FIG. 3 Is an alternate embodiment of the connectable trunk lid prop.

FIG. 4 Is a partial detail view of the end connector at one end of the prop of FIG. 3.

FIG. 5 Is a partial cross sectional view of a portion of the connectable prop of FIG. 3.

DETAILED DESCRIPTION OF THE PREFERRED EMBODIMENTS

The connectable trunk lid prop of this invention, designated generally by the reference numeral 10, is shown in a first preferred embodiment in FIGS. 1 and 2. The connectable trunk lid prop 10 has an elongated body 12 with opposite distal ends 14 and 16. The body 12 forms a brace member 18 with end connectors 20 and 22 at the respective ends 14 and 16.

In the embodiment of FIG. 1, the body 12 and end connectors 20 and 22 are formed from a rectangular bar stock 24 as a unitary, single-piece brace member, that is preferably of a nonconductive material such as plastic. The end connectors 20 and 22 are configured to allow the connectors to engage the separated parts 26 and 28 of a trunk lid lock 31, comprising a caliper-type locking mechanism 30, which is used to secure a trunk lid FIG. 2, to a compartment frame 34 (shown in part in FIG. 2). It is to be understood that the trunk lid locking mechanism of different automobiles may differ in certain details of construction that require minor modifications to the end connectors of the brace member. Typically, however, the trunk lid locking mechanism has a caliper-like engagement latch 36 and a loop member 38 mounted respectively on the trunk lid 32 and on the compartment frame 34 of a trunk compartment (not shown). In certain vehicles the caliper-like engagement latch may be mounted in the compartment frame and the bolt member mounted in the trunk lid. Commonly, the bolt member comprises a staple bolt 40 that forms a loop 42 and has ends 44 (one shown in FIG. 2) that include a nut assembly 46 that permit the staple bolt 40 to be secured to the compartment frame 34. In certain embodiments, the bolt member 38 may comprise a cantilevered member with an end head wherein the bolt shaft comprises the engaged portion of the member.

With reference to FIG. 1, the end connector 22 that engages the caliper-like engagement latch 36, as shown in FIG. 2, comprises an eyelet 48 that is proximate a nock 50 at the end 16 of the prop body 12. At the opposite end of the brace member 18 is an end connector 20 comprising a clip 51 having an eyehole 52 protected by a guard member 54. The guard member 54 comprises a flexible tongue 56 cut into the brace member 18 by cuts 58 and 60 to the eyehole 52. In this manner, the tongue 56 can be deflected with a user's thumb when installing the loop portion 42 of the staple bolt 40 into the eyehole 52 of the end connector 20.

The end connector 22 at the opposite end 16 is engaged by a pair of engagement members 62 of the caliper-like engagement latch 36 when the nock 50 is positioned against the latch 36 and the trunk lid is lowered, while the brace member is braced by engagement of the clip 51 with the staple bolt 40.

In order to disengage the nocked end connector 22 that is engaged with the caliper-like engagement assembly 36, the user must retract the engagement members 62 using a trunk key.

In order to properly orient the end connectors 20 and 22 with regard to the respective parts 26 and 28 of the trunk lid locking mechanism 30, the rectangular body 12 forming the brace member 18 has a central twist 64 that reorients the flat ends 14 and 16 of the flat brace member 18 are substantially perpendicular to one another. Additionally, the twist 64 provides additional strength to the elongated body 12 to resist deforming under compression from the trunk lid 32.

Referring now to FIGS. 3 to 5, an alternate embodiment of a connectable trunk lid prop, designated by the reference numeral 70, is shown. The trunk lid prop 70 has a body 72 with telescoping brace members 74 and 76 that permit the length of the trunk lid prop 70 to be adjusted according to the desire of a user. The length of the body 72 is fixed by tightening a collar 78 that threadably engages the larger diameter brace member 76 and compresses an o-ring 80, as shown in FIG. 5. The compressed o-ring 80 frictionally secures the extendable brace member 74 to the larger diameter brace member 76. The brace members 74 and 76 have end connectors 82 and 84, respectively. The end connectors 82 and 84 are similar in construction to those end connectors 20 and 22 previously described with reference to FIGS. 1 and 2. The end connector 82 has a recess or nock 86 that is proximate an eyelet 88 that facilitates engagement of the end connector 82 to a caliper-like engagement latch of a trunk lid locking mechanism as previously described. As shown in FIG. 4, the nock 86 may be combined with a constricted cross member 90 to further facilitate the interconnection.

The opposite end connector 84 has a clip 91 formed with an open eyehole 92 with a hole guard 94 having a cut 96 in a recessed web portion 98 of the clip 91. This design facilitates the connection of the end connector 84 with a loop member of a typical staple bolt 40 as described in reference to the prior embodiment. Although, the alternate embodiment 70 is slightly more expensive to fabricate, the simplicity of the design minimizes costs and provides added flexibility in the length of the body of the connectable prop. However, it is contemplated that the trunk lid prop 10 of FIGS. 1 and 2 can be provided in a kit with a series of different length brace members. In this manner, a user may have two or more of the inexpensively fabricated trunk lid props as described. Although the props of the embodiments can be fabricated from materials other than plastic, it is preferred that an electrical connection not be permitted between end connectors, which may adversely affect the electrical systems of certain vehicles.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A trunk lid prop for a trunk compartment having a compartment frame and a trunk lid with a trunk lock, the trunk lock having a latch on one of the trunk lid and the trunk compartment frame, and having a bolt on the other of the trunk lid and the trunk lid compartment frame, the trunk lid prop comprising:

an elongated brace member in the form of a unitary, single-piece strut, the brace member having a substantially rectangular cross section with a first flat end with an eye clip engageable with the bolt of the trunk lock, and, a second flat end distant from the first end having an end tip and an eyehole proximate the end tip, wherein the end tip has a guide means engageable with the latch of the trunk lock for guiding the latch to the eyehole of the second end of the brace member, wherein the brace member has a twist between the first flat end and the second flat end, wherein the first flat end is oriented perpendicular to the second flat end, wherein the strut resists compressive forces directed at the ends of the brace member, and wherein the first flat end and the second flat end lie along a longitudinal axis of the brace member.

2. The trunk lid prop of claim 1 wherein the latch of the trunk lid lock includes caliper members and wherein the guide means of the brace member is positionable against the caliper members for engagement of the caliper members with the end tip through the eyehole when the trunk lid prop is installed on a trunk compartment.

3. The trunk lid prop of claim 3 wherein the guide means comprises a recess in the end tip.

4. The trunk lid prop of claim 3 wherein the recess forms a nock at the end of the brace member.

* * * * *